United States Patent [19]

Dunn

[11] Patent Number: 4,457,799

[45] Date of Patent: Jul. 3, 1984

[54] BONDING ELASTOMERS

[75] Inventor: John R. Dunn, Sarnia, Canada

[73] Assignee: Polysar Limited, Ontario, Canada

[21] Appl. No.: 467,341

[22] Filed: Feb. 17, 1983

Related U.S. Application Data

[63] Continuation-in-part of Ser. No. 357,748, Mar. 12, 1982, abandoned.

[51] Int. Cl.³ .............................................. B32B 31/26
[52] U.S. Cl. .................................. 156/307.1; 138/137; 427/387; 427/393.5; 428/36; 428/421; 524/262
[58] Field of Search ...................... 156/307.1; 524/262; 138/137; 427/393.5, 387; 428/36, 421; 525/326.3, 329.3

[56] References Cited

U.S. PATENT DOCUMENTS

| 4,201,698 | 5/1980 | Itoh et al. | 524/262 |
| 4,207,364 | 6/1980 | Nyberg | 428/36 |
| 4,229,333 | 10/1980 | Wolff et al. | 524/262 |
| 4,323,603 | 4/1982 | Close | 427/393.5 |
| 4,330,017 | 5/1982 | Satoh et al. | 138/137 |

Primary Examiner—John J. Gallagher
Attorney, Agent, or Firm—Stevens, Davis, Miller & Mosher

[57] ABSTRACT

An improved method is provided for bonding together layers of fluoroelastomer compound and butadiene-acrylonitrile polymer compound by incorporating into one or both of the compounds a polysulphidic silane compound prior to vulcanization. There is also provided a vulcanized hose having an inner layer of fluoroelastomer compound and an outer layer of a butadiene-acrylonitrile polymer compound containing a polysulphidic silane compound incorporated into either layer.

9 Claims, No Drawings

BONDING ELASTOMERS

This is a continuation-in-part application of U.S. Ser. No. 357,748, filed Mar. 12, 1982, now abandoned.

BACKGROUND OF THE INVENTION

This invention is directed to an improved method of bonding together layers of fluoroelastomer compound and butadiene-acrylonitrile polymer compound by incorporating into one or both of the compounds a polysulphidic silane compound prior to vulcanization.

DESCRIPTION OF THE PRIOR ART

The prior art is replete with composite materials prepared by the bonding together of at least two layers of different polymeric materials. Improvements in bonding of the layers together have been achieved by the introduction of an adhesive layer between two layers of the different polymeric materials such as in published British patent application No. 2072576A. Achieving good bonding of fluoroelastomer compounds to other non-fluorine containing polymeric compounds has long been recognized as a difficult task.

SUMMARY OF THE INVENTION

I have now discovered an improved method for the bonding of a layer of a fluoroelastomer compound to a layer of a butadiene-acrylonitrile polymer compound by incorporating, prior to bonding the layers together and vulcanization, into either or both of the compounds a polysulphidic silane compound.

In accordance with my invention, there is provided an improved method of bonding a layer of a fluoroelastomer compound to a layer of a butadiene-acrylonitrile polymer compound wherein the improvement consists of incorporating into the butadiene-acrylonitrile polymer compound from about 1 to about 5 parts by weight per 100 parts by weight of butadiene-acrylonitrile polymer of a polysulphidic silane compound prior to bonding the two layers together and vulcanizing the layers in contact with each other.

Further in accordance with my invention, there is provided an improved method of bonding a layer of a fluoroelastomer compound to a layer of a butadiene-acrylonitrile polymer compound wherein the improvement consists of incorporating into the fluoroelastomer compound from about 1 to about 5 parts by weight per 100 parts by weight of fluoroelastomer compound of a polysulphidic silane compound prior to bonding the two layers together and vulcanizing the layers in contact with each other.

Still further in accordance with my invention, there is provided an improved method of bonding a layer of a fluoroelastomer compound to a layer of a butadiene-acrylonitrile polymer compound wherein the improvement consists of incorporating into each of the fluoroelastomer compound and the butadiene-acrylonitrile polymer compound from about 1 to about 3 parts by weight per 100 parts by weight of the fluoroelastomer and of the butadiene-acrylonitrile polymer of a polysulphidic silane compound prior to bonding the two layers together and vulcanizing the layers in contact with each other.

Still further in accordance with my invention, there is provided a hose assembly comprising two layers, the inner layer being a fluoroelastomer compound and the outer layer being a butadiene-acrylonitrile polymer compound containing in either layer from about 1 to about 5 parts by weight per 100 parts by weight of butadiene-acrylonitrile polymer or of fluoroelastomer of a polysulphidic silane compound, the hose assembly having been vulcanized by heating at a temperature of from about 150° C. to about 180° C. for a time of from about 10 to about 60 minutes.

DETAILED DESCRIPTION OF THE INVENTION

The fluoroelastomers useful in my invention are polymers based on vinylidene fluoride and hexafluoropropylene optionally also containing such other fluorinated compounds as tetrafluoroethylene and perfluoromethylvinyl ether and optionally ethylenically unsaturated olefins. These polymers are produced by high pressure aqueous emulsion polymerization generally using fluorocarbon emulsifiers, persulphate initiators and molecular weight control agents. Such polymers are well known commercially. A large proportion of these polymers are available with incorporated cure systems so that the compounder only has to add metallic oxide acid acceptors and fillers, and other optional compounding components, to produce a compound suitable for curing. The exact nature of the individual fluoroelastomers and of the incorporated cure systems are not generally disclosed.

The butadiene-acrylonitrile polymers useful in my invention are polymers prepared by free radical aqueous emulsion polymerization and contain from about 50 to about 80 weight percent of butadiene and about 20 to about 50 weight percent of acrylonitrile. I prefer to use polymers containing from about 30 to about 40 weight percent of acrylonitrile and, correspondingly, from about 60 to about 70 weight percent of butadiene. Such polymers are well known commercially.

The fluoroelastomer compounds that I use comprise the fluoroelastomer, the incorporated cure system, one or more inorganic acid acceptors such as magnesium oxide, cadmium oxide, calcium oxide, calcium hydroxide and zinc oxide and one or more filler such as carbon black, silica and barytes and may include processing aids such as Carnauba Wax, low molecular weight polyethylene and pentaerythritol tetrastearate. Such compounds may be prepared by well known mixing procedures including mill mixing and internal mixer mixing.

The butadiene-acrylonitrile polymer compounds that I use comprise the butadiene-acrylonitrile polymer, one or more fillers such as carbon black, silica and barytes, optionally a compatible plasticizer such as dioctyl phthalate, dibutyl phthalate, dioctyl adipate, dibutyl sebacate and dioctyl sebacate, one or more metal oxides such as magnesium oxide, cadmium oxide, calcium oxide and zinc oxide, one or more antioxidants especially those having low volatility, an organic peroxide such as dicumyl peroxide, lauryl peroxide and benzoyl peroxide and curing coagents for use with organic peroxides such as phenylene dimaleimide, and the various di-or tri-(meth)acrylates. Small amounts of fluoroelastomer may also be mixed with the butadiene-acrylonitrile polymer, such that the fluoroelastomer does not form more than about 25 percent by weight of the fluoroelastomer-butadiene-acrylonitrile polymer mixture. Such compounds may be prepared by well known mixing procedures including mixing on a mill and in an internal mixer.

The polysulphidic silane compound that I add to the fluoroelastomer compound or to the butadiene-acrylonitrile polymer compound may be selected from the bis-[alkoxysilyl-alkyl]-tetrasulphides and bis-[alkoxysilyl-aryl]-tetrasulphides. Examples of such polysulphidic silane compounds are bis-[3-(triethoxysilyl)-propyl]-tetrasulphide and bis-[triethoxysilyl-ethyl-tolylene]-tetrasulphide. The amount of polysulphidic silane compound that I add is from about 1 to about 5 parts by weight, preferably from about 1.5 to about 4 parts by weight, per 100 parts by weight of the fluoroelastomer or of the butadiene-acrylonitrile polymer. When the polysulphidic silane compound is added to both the fluoroelastomer compound and to the butadiene-acrylonitrile polymer compound, I add from about 1 to about 3 parts by weight of the polysulphidic silane per 100 parts by weight of the fluoroelastomer compound and of the butadiene-acrylonitrile polymer compound. The polysulphidic silane compound may be readily added to the fluoroelastomer compound or to the butadiene-acrylonitrile polymer at the same time that the other compounding ingredients are being added. For reasons of economy, I prefer to add polysulphidic silane to only one compound and I find that addition to the butadiene-acrylonitrile polymer compound generally gives satisfactory results.

The fluoroelastomer compound and the butadiene-acrylonitrile polymer compound are formed into sheets of appropriate thickness, the surfaces of the sheets may be wiped clean for example with any of the well known surface cleaning agents such as cyclohexanone, the sheets are placed one on top of another to form two layers, placed in a mold and vulcanized by heating to a temperature of about 150° to about 180° C. for a time of from about 10 to about 60 minutes.

Uses for the layered composite of my invention include fuel line hose with the fluoroelastomer being the inner layer, other hose for transfer of various organic materials, lining of vessels, membranes and the like.

A hose may be manufactured such as by producing an inner core, covering the core with reinforcement in the form of a braid or spiral and optionally applying a cover, following which the whole is vulcanized. A core may be produced of a laminate of my invention and having two layers, the inner layer being a fluoroelastomer compound and the outer layer being a butadiene-acrylonitrile polymer compound with either layer containing polysulphidic silane, the core may then be reinforced by encasing with a suitable yarn or wire braid or spiral and the reinforced core may optionally then have a cover applied. The whole assembly is then vulcanized by heating. It is also possible to use various techniques to reduce neckdown or flattening of the core during processing such as by using microwave energy to partially vulcanize the core.

The following examples illustrate the present invention, all parts being by weight.

EXAMPLE 1

Fluoroelastomer compounds and butadiene-acrylonitrile polymer compounds were prepared by mixing on a two roll rubber mill according to the recipes shown in Table I. Layers of the two compounds, about 0.15 cm thick, were surface cleaned by mixing with cyclohexanone, pressed one on top of the other in a mold and cured by heating for 45° minutes at 160° C. The peel strength of the so-formed laminates was determined using an Instron tester to separate the laminate at a separation speed of 30 cm/min. with the results shown in Table II.

TABLE I

| Fluoroelastomer | Compound #1 | Compound #2 |
|---|---|---|
| Fluorel 2182 | 100 | — |
| Fluorel 2182-A | — | 100 |
| Carbon Black | 30 | 25 |
| Barytes | — | 25 |
| Magnesium Oxide | 3 | 3 |
| Calcium Hydroxide | 6 | 3 |
| Carnauba Wax | 0.5 | 2 |
| Polyethylene | 1 | — |

| | Compound #3 | Compound #4 |
|---|---|---|
| Butadiene-acrylonitrile polymer | 100 | 100 |
| Antioxidant | 2 | 2 |
| Magnesium Oxide | 3 | 3 |
| Calcium Oxide | 3 | 3 |
| Carbon Black | 25 | 25 |
| Barytes | 25 | 25 |
| Phenylene Dimaleimide | 1 | 1 |
| Dicumyl Peroxide | 3.5 | 3.5 |
| Polysulphidic Silane | — | 2 |

TABLE II

| Peel Strength (KN/m) | |
|---|---|
| Compound 1 to Compound 3 | 0.6 |
| Compound 1 to Compound 4 | 0.8 |
| Compound 2 to Compound 3 | 0.6 |
| Compound 2 to Compound 4 | 1.5 |

The improved adhesion to Compound 4 is readily seen.

EXAMPLE 2

Butadiene-acrylonitrile polymer compounds were prepared according to the recipes shown in Table III. Laminates were prepared by pressing sheets of these compounds to sheets of Compound #2 of Example 1 and curing by heating at 160° C. for 45 minutes. The peel strength of the laminates was determined with the results shown in Table III, in which Compounds #10 and 11 are controls outside the scope of my invention.

TABLE III

| Compound # | 10 | 11 | 12 | 13 | 14 |
|---|---|---|---|---|---|
| Butadiene-acrylonitrile polymer | 100 | 100 | 100 | 100 | 100 |
| Antioxidant | 2 | 2 | 2 | 2 | 2 |
| Magnesium Oxide | 10 | 10 | 10 | 10 | 10 |
| Calcium Oxide | 10 | 10 | 10 | 10 | 10 |
| Carbon Black | 30 | 30 | 30 | 30 | 30 |
| Phenylene Dimaleimide | 1 | 1 | 1 | 1 | 1 |
| Dicumyl Peroxide | 3.5 | 3.5 | 3.5 | 3.5 | 3.5 |
| Polysulphidic Silane | — | 0.5 | 1 | 2 | 4 |
| Peel Strength (kN/m) | 1.3 | 1.2 | 1.6 | 2.5 | 2.5 |

EXAMPLE 3

A fluoroelastomer compound was prepared according to the recipe of Example 1, Compound #2. A butadiene-acrylonitrile polymer compound was prepared according to the recipe of Example 2, Compound #10 and further such compounds were prepared by the addition of a silane compound to each as shown in Table IV. Laminates were prepared, cured and tested as in Example 1 with the results shown in Table IV, in which only Compound #21 is within the scope of this invention.

TABLE IV

| Compound # | 20 | 21 | 22 | 23 | 24 | 25 |
|---|---|---|---|---|---|---|
| Silane Additive: | | | | | | |
| Polysulphidic Silane | — | 2 | — | — | — | — |
| Methacryloxy Propyl Trimethoxy Silane | — | — | 2 | — | — | — |
| Glycidoxypropyl Trimethoxy Silane | — | — | — | 2 | — | — |
| Mercaptopropyl Trimethoxy Silane | — | — | — | — | 2 | — |
| Aminopropyl Trimethoxy Silane | — | — | — | — | — | 2 |
| Peel Strength (kN/m) | 1.3 | 2.5 | 0.8 | 0.8 | 1.2 | 1.9 |

EXAMPLE 4

Two fluoroelastomer compounds were prepared in which the only difference was the inclusion in one of a polysulphidic silane compound. Two butadiene-acrylonitrile polymer compounds were prepared in which the only difference was the inclusion in one of a polysulphidic silane compound. The recipes are shown in Table V. Laminates were prepared of each fluoroelastomer compound pressed onto each butadiene-acrylonitrile polymer compound followed by curing by heating at 160° C. for 45 minutes. The peel strength data are shown in Table V. The laminates formed by adhering Compound #31 to each of Compounds #32 and 33 and by adhering Compound #33 to Compound #30 are within the scope of this invention, whereas the laminate formed by adhering Compound #30 to Compound #32 is outside the scope of the invention.

TABLE V

| Compound # | 30 | 31 | 32 | 33 |
|---|---|---|---|---|
| Fluoroelastomer | 100 | 100 | — | — |
| Carbon Black | 30 | 30 | — | — |
| Magnesium Oxide | 10 | 10 | — | — |
| Calcium Oxide | 10 | 10 | — | — |
| Antioxidant | 2 | 2 | — | — |
| Polysulphidic Silane | — | 2 | — | — |
| Butadiene-acrylonitrile polymer | — | — | 100 | 100 |
| Antioxidant | — | — | 2 | 2 |
| Magnesium Oxide | — | — | 10 | 10 |
| Calcium Oxide | — | — | 10 | 10 |
| Carbon Black | — | — | 30 | 30 |
| Phenylene Dimaleimide | — | — | 1 | 1 |
| Dicumyl Peroxide | — | — | 3.5 | 3.5 |

TABLE V-continued

| Compound # | 30 | 31 | 32 | 33 |
|---|---|---|---|---|
| Polysulphidic Silane | — | — | — | 2 |
| Peel Strength (kN/m) | | | | |
| Compound 30/Compound 32 | | 0.5 | | |
| Compound 31/Compound 32 | | 1.3 | | |
| Compound 30/Compound 33 | | 2 | | |
| Compound 31/Compound 33 | | 2.6 | | |

EXAMPLE 5

The butadiene-acrylonitrile polymer compounds were prepared as shown in Table VI where Silane-1 is bis-[3-(triethoxysilyl)-propyl]-tetrasulphide and Silane-2 is bis-[triethoxysilyl-ethyltolylene]-tetrasulphide. As described in Example 1, layers of these compounds were pressed onto a layer of Compound #'of Example 1 or a layer of a Viton ® compound, cured for 30 minutes at 160° C. and the peel strength of the so-formed laminates was measured, the results being given in Table VI.

TABLE VI

| Compound No. | 40 | 41 | 42 | 43 | 44 | 45 |
|---|---|---|---|---|---|---|
| Butadiene-acrylonitrile polymer | | | | 200 | | |
| Antioxidant | | | | 4 | | |
| Magnesium oxide | | | | 20 | | |
| Calcium oxide | | | | 20 | | |
| Carbon black (N-990) | 100 | 100 | 100 | 60 | 60 | 60 |
| Carbon black (N-550) | — | — | — | 40 | 40 | 40 |
| Dibutyl sebacate | | | | 20 | | |
| Silane-1 | 4 | 4 | 4 | — | — | — |
| Silane-2 | — | — | — | 4 | 4 | 4 |
| Phenylene dimaleimide | — | — | — | 2 | — | — |
| Ethylene glycol dimethacrylate | 5 | — | — | — | 5 | — |
| Trimethylol propane trimethacrylate | — | 5 | — | — | — | — |
| 1,3-Butylene glycol dimethacrylate | — | — | 10 | — | — | 10 |
| 2,5-Bis(tert-butyl-peroxy)-2,5-dimethylhexane | 7 | 7 | 3 | 7 | 7 | 7 |
| Peel Strength (kN/m) | | | | | | |
| to Compound #2 | 3.3 | 1.8 | 3.4 | — | — | — |
| to Viton compound | — | — | — | 3.7 | 2.9 | 5.9 |

What is claimed is:

1. An improved method of bonding a layer of a fluoroelastomer compound to a layer of a butadiene-acrylonitrile polymer compound, said fluoroelastomer compound containing a fluoroelastomer based on vinylidene fluoride and hexafluoropropylene optionally also containing tetrafluoroethylene, perfluoromethylvinyl ether or ethylenically unsaturated olefins, and containing one or more inorganic acid acceptors selected from magnesium oxide, cadmium oxide, calcium oxide, calcium hydroxide and zinc oxide, wherein the improvement is the incorporation into each of the fluoroelastomer compound and the butadiene-acrylonitrile polymer compound from about 1 to about 3 parts by weight per 100 parts by weight of the fluoroelastomer and of the butadiene-acrylonitrile polymer of a polysulphidic silane compound prior to bonding the two layers together and vulcanizing the layers in contact with each other.

2. The method of claim 1 wherein the polysulphidic silane compound is selected from a bis-[alkoxysilyl-alkyl]-tetrasulphide and a bis-[alkoxysilyl-aryl]-tetrasulphide.

3. An improved method of bonding a layer of a fluoroelastomer compound to a layer of a butadiene-acrylonitrile polymer compound, said fluoroelastomer compound containing a fluoroelastomer based on vinylidene fluoride and hexafluoropropylene optionally also containing tetrafluoroethylene, perfluoromethylvinyl ether or ethylenically unsaturated olefins and containing one or more inorganic acid acceptors selected from magnesium oxide, cadmium oxide, calcium oxide, calcium hydroxide and zinc oxide, wherein the improvement is the incorporation into the butadiene-acrylonitrile polymer compound of from about 1 to about 5 parts by weight per 100 parts by weight of butadiene-acrylonitrile polymer of a polysulphidic silane compound prior to bonding the two layers together and vulcanizing the layers in contact with each other.

4. The method of claim 3 wherein the polysulphidic silane compound is selected from bis-[3-(triethoxysilyl)-propyl]-tetrasulphide, and bis-[triethoxysilyl-ethyltolylene]-tetrasulphide.

5. The method of claim 4 wherein the fluoroelastomer compound further comprises an incorporated cure system, and one or more fillers selected from carbon black, silica and barytes.

6. The method of claim 5 wherein the butadiene-acrylonitrile polymer contains from about 20 to about 50 weight percent of acrylonitrile and the butadiene-acrylonitrile polymer compound comprises the butadiene-acrylonitrile polymer, one or more fillers selected from carbon black, silica and barytes, optionally a compatible plasticizer, one or more metal oxides selected from magnesium oxide, cadmium oxide, calcium oxide and zinc oxide, one or more antioxidants, an organic peroxide and a curing coagent.

7. The method of claim 3 wherein the layer of fluoroelastomer compound and the layer of butadiene-acrylonitrile polymer compound are vulcanized by heating to a temperature of from about 150° C. to about 180° C. for a time of from about 10 to about 60 minutes.

8. An improved method of bonding a layer of a fluoroelastomer compound to a layer of a butadiene-acrylonitrile polymer compound, said fluoroelastomer compound containing a fluoroelastomer based on vinylidene fluoride and hexafluoropropylene optionally also containing tetrafluoroethylene, perfluoromethylvinyl ether or ethylenically unsaturated olefins, and containing one or more inorganic acid acceptors selected from magnesium oxide, cadmium oxide, calcium oxide, calcium hydroxide and zinc oxide, wherein the improvement is the incorporation into the fluoroelastomer compound of from about 1 to about 5 parts by weight per 100 parts by weight of fluoroelastomer of a polysulphidic silane compound prior to bonding the two layers together and vulcanizing the layers in contact with each other.

9. The method of claim 8 wherein the polysulphidic silaane compound is selected from bis-[3-(triethoxysilyl)-propyl]-tetrasulphide and bis-[triethoxysilyl-ethyltolylene]-tetrasulphide.

* * * * *